Dec. 8, 1953  P. F. DOUGHERTY ET AL  2,662,041
PROCESS FOR CLEANING REFINING EQUIPMENT
Filed Dec. 30, 1949
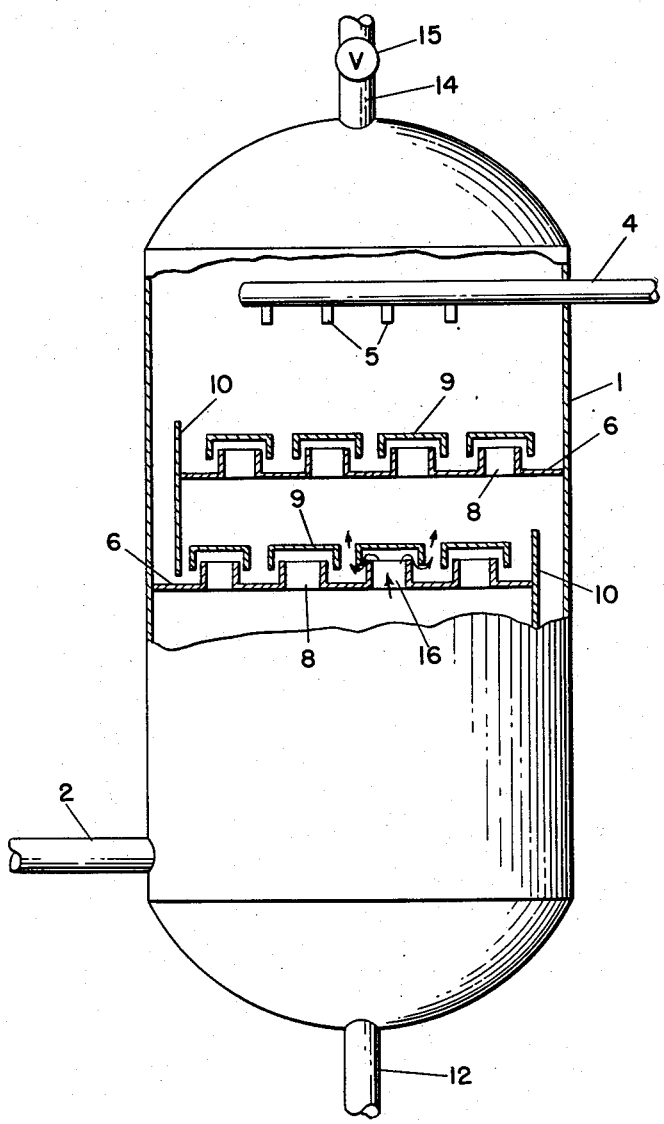
INVENTORS.
PATRICK F. DOUGHERTY
LLOYD G. MAGILL
BY
ATTORNEYS Patented Dec. 8, 1953

2,662,041

UNITED STATES PATENT OFFICE 2,662,041

PROCESS FOR CLEANING REFINING EQUIPMENT

Patrick F. Dougherty, Chester Heights, and Lloyd G. Magill, Parkland, Pa., assignors to Sun Oil Company, Philadelphia, Pa., a corporation of New Jersey Application December 30, 1949, Serial No. 136,118

5 Claims. (Cl. 134—5)

This invention relates to a process for cleaning petroleum refinery equipment, and more particularly relates to the removal of sulfur from absorption towers and like equipment.

Free sulfur, hydrogen sulfide, and various organic compounds of sulfur, such as thiophenes, mercaptans, and the like, are present in most crude petroleums. Such sulfur and sulfur compounds are the source of considerable trouble, such as the corrosion of metal equipment. A further difficulty is the fouling of refinery equipment by elemental sulfur, i. e., free or metallic sulfur. This difficulty is especially evident in absorption towers equipped with bubble trays. Elemental sulfur, which may be present in the original petroleum crude, or which may be formed from other sulfur compounds such as by the oxidation of hydrogen sulfide, deposits on the bubble trays and interferes with the operation of the tower.

Heretofore sulfur has been removed from absorption towers by discontinuing normal operation, and introducing steam into the tower at a temperature above the melting point of sulfur. The melted sulfur flows to the bottom of the tower and is removed therefrom. This procedure is unsatisfactory, since a layer of sulfur may remain on a tray or trays, and partially or completely plug the orifices through which gas or liquid, or both, must pass. Where the bubble trays are designed to retain liquid thereon, this difficulty is especially apparent, since the agitation of molten sulfur on the trays by the steam is insufficient to cause the sulfur to flow over the barriers employed to retain liquid on the trays, and hence the sulfur does not flow to the bottom of the tower, but remains on the tray.

The principal object of the present invention is to provide a simple and effective process for removing elemental sulfur from absorption towers having vertically spaced trays designed to hold a portion of liquid thereon. Other objects appear hereinafter.

It has now been found that elemental sulfur deposited on the bubble trays of absorption towers may be removed therefrom by filling the trays with hot water, introducing steam into the tower bottom, and removing a mixture of water and sulfur from the tower bottom. The steam must be introduced at a temperature above the melting point of the sulfur, and the pressure in the tower should be maintained so that the temperature of the water contained on the trays will be above the melting point of sulfur, and preferably approximates the temperature of the steam so that equilibrium is substantially maintained between the steam and water. Under these operating conditions, steam passing up through the orifices of the bubble trays causes agitation of the mixture of water and sulfur sufficient to cause the mixture to flow over the barriers of the trays and to the tower bottom, where it is removed. It is advantageous, especially where the quantity of sulfur to be removed is substantial, to continuously add hot water into the top of the tower thereby continuously replenishing the supply, and insuring sufficient water to completely flush the sulfur to the tower bottom.

In accordance with the present invention, when an absorption tower becomes fouled with sulfur, normal operation thereof is discontinued, the trays are filled with hot water, and steam under pressure is introduced into the bottom of the tower. The bubble trays may be initially filled with water by any convenient means, such as by introducing water, preferably hot, into the top of the absorption tower, and permitting it to run down and fill the successive trays. Preferably hot water is continuously introduced into the top of the tower during the cleaning process. The temperature of the steam introduced into the tower should be above 120° C., and preferably is between 125° C. and 150° C., although higher temperatures may be employed. However, the temperature should not exceed about 190° C., since the sulfur tends to become viscous at such temperatures. The pressure in the tower during the cleaning operation is regulated to maintain the temperature of the steam and water in the tower to within the stated temperature ranges. In general, to maintain the temperature within the preferred range the pressure within the equipment being cleaned will be from about 20.1 to 54.3 p. s. i. g. Steam should be introduced into the bottom of the tower at a rate sufficient to cause agitation of the water-sulfur mixture on the tray, and will of course depend largely upon the size of the tower and design of the bubble trays. In general, the quantity of steam introduced should be such that the slot velocity of the steam is within the range of from 1 to 5 ft./sec., i. e., the linear velocity of steam passing through the bubble caps of the trays, or the slots in the bubble caps, depending on the particular design thereof, should be maintained within the stated range.

Referring now to the drawing, numeral 1 represents an absorption tower of common design. In normal operation a gas stream containing hydrocarbons to be removed is introduced into tower 1 through pipe 2 and ascends in the tower. An absorption oil is introduced through pipe 4 and nozzles 5, and flows downward in the tower filling vertically spaced bubble trays 6. Ascending vapors pass through the orifices in the bubble trays illustrated by 8, and are deflected into the oil on the tray at a point below the liquid level by bubble caps illustrated by 9. The upflow of vapors through the orifices, as shown by the arrows passing through orifice 16, is sufficient to prevent any substantial amount of oil from flowing down through the orifices, and to maintain vigorous agitation of the oil. The oil flows over a barrier, or weir, illustrated by 10, which determines the liquid level in the tray, and then into the next lower tray. Oil containing absorbed hydrocarbons is removed through pipe 12 and unabsorbed gases exit through pipe 14.

In accordance with the present process, when the trays become fouled with sulfur, normal operation is discontinued, pipe 14 is closed off such as by valve 15, and sufficient water is introduced through pipe 4 to fill the bubble trays. Preferably the water is hot and preferably sufficient water is introduced into the tower to flush absorption oil therefrom. Steam is now introduced through pipe 2, and passes up through the bubble trays. Employing the conditions hereinbefore defined, a mixture of sulfur and water is carried over the barriers 10 and finally is removed through pipe 12. It is advantageous to maintain a constant input of hot water through pipe 4 to insure complete removal of the sulfur. It may also be desirable to bleed a quantity of steam through pipe 14 and valve 15 in order to aid in maintaining the defined conditions of temperature and pressure, and to secure agitation of the mixture of sulfur and water.

The following description of a refinery operation illustrates the difficulties obviated by the present invention. Refinery gas streams from topping and cracking operations, consisting of a mixture of methane, ethane, propane, butanes, pentanes, hexanes, and a small amount of other hydrocarbons, and containing 400 grains of hydrogen sulfide per 100 cu. ft. of gas, a small quantity of sulfur dioxide and other sulfur compounds, and about 8% water, were continuously introduced into the bottom of an absorption tower of the design shown in the drawing. An absorption oil, a hydrocarbon fraction boiling in the kerosene range, was continuously introduced into the top of the tower and passed downward in countercurrent relation to the ascending gas stream. The gas stream was introduced into the tower at a rate of 500,000 cu. ft./hr., and the absorption oil at a rate of 37,800 gal./hr. Methane and ethane were not absorbed to any appreciable extent by the oil, and passed from the top of the absorption tower through a gas exit to be used as fuel in a separate operation. The absorption oil, containing the remaining hydrocarbons absorbed therein, passed from the tower bottom to a stripping operation in accordance with known practice.

After about 6 months of operation, the bubble trays of the tower became fouled with sulfur thereby decreasing the throughput so that further operation was not feasible. The absorption operation was discontinued and steam at a temperature above the melting point of sulfur was introduced into the tower. A substantial quantity of molten sulfur ran to and was removed from the tower bottom, apparently all of the sulfur being so removed.

On resuming operation, when absorption oil was introduced into the tower, the oil passed out through the gas exit rather than down through the tower, and on reaching the burners normally fired with a mixture of methane and ethane, a large quantity of the absorption oil was destroyed while creating a serious hazard. It was found that at least one bubble cap tray was effectively sealed with solidified sulfur, which caused the absorption oil to back into the gas exit line.

On employing the process of the present invention for removing sulfur from the absorption tower, the sulfur is substantially completely removed, and hence the aforementioned difficulty is obviated. Substantially complete sulfur removal is indicated when the effluent water is free from sulfur, which may be determined by visual observation.

It will be apparent that the present process is applicable to refinery equipment other than absorption towers, and in general may be employed for cleaning sulfur fouled enclosed apparatus containing vertical trays, or their equivalent, designed to retain liquid thereon. In apparatus providing for free liquid flow to the bottom thereof, the process of the present invention is unnecessary, since molten sulfur will flow to the bottom on heating, and may be removed therefrom without difficulty. Also, in the preferred embodiment wherein water is continuously introduced into the tower top, the temperature of the steam introduced may be substantially above the temperature of the water, say from 10° C. to 50° C. above the water temperature, so long as the temperature of the water is maintained above the melting point of sulfur.

The invention claimed is:

1. Process for removing sulfur from an absorption tower containing a plurality of bubble trays which comprises discontinuing normal operation of the absorption tower, introducing hot water into said bubble trays, introducing steam at a temperature of from about 125° C. to about 150° C. into the bottom of said tower and passing said steam up through the gas spaces in each of said bubble trays thereby causing agitation of the mixture of sulfur and water thereon so that said mixture of sulfur and water flows over the barriers of the trays to the bottom of said tower, maintaining the pressure within the absorption tower sufficient to maintain the temperature of said steam and said water therein above the melting point of sulfur, removing a mixture of water and sulfur from the bottom of said tower, and continuing said process until the sulfur is substantially completely removed from said tower.

2. Process according to claim 1 wherein hot water is continuously introduced into the top of the absorption tower.

3. Process for removing sulfur from an absorption tower containing a plurality of bubble trays which have become fouled by deposition of sulfur thereon which comprises introducing hot water into said bubble trays, introducing steam at a temperature of from about 125° C. to about 150° C. into the bottom of said tower, passing said steam up through the gas spaces in each of said bubble trays at a slot velocity of from 1 to 5 ft./sec. thereby causing agitation of a mixture of sulfur and water thereon whereby said mixture of sulfur and water flows over the barriers of the trays to the bottom of said tower, maintaining the pressure within the absorption tower sufficient to maintain the temperature of said steam and said water therein above the melting point of sulfur, removing a mixture of water and sulfur from the bottom of said tower, and continuing said process until the sulfur is substantially completely removed from said tower.

4. Process according to claim 3 wherein hot water is continuously introduced into the top of the absorption tower.

5. Process for removing sulfur from an absorption tower containing a plurality of bubble trays, said bubble trays having a plurality of upwardly extending flanges surrounding openings in said trays, inverted barrier cups overlying said flanges, and side barriers impeding downward liquid flow, which comprises introducing hot water into said trays by downward flow thereover, flowing steam upward through said openings against said inverted barrier cups and thence downward into said trays, maintaining the steam at a temperature above the melting point of the sulfur while maintaining in the tower a pressure adequate to maintain the temperature of the water above the melting point of the sulfur, and imparting to the upflowing steam a high slot velocity flow adequate, in the downward flow of steam into said trays caused by said inverted cup barriers, to cause the steam to enter the trays with a force sufficient to violently agitate the mixture of sulfur and water in the trays and cause the mixture to forcibly overflow the barriers of the trays which impede downward liquid flow, removing a mixture of water and sulfur from the bottom of said tower, and continuing the process until the sulfur is substantially completely removed from the tower.

PATRICK F. DOUGHERTY.
LLOYD G. MAGILL.

References Cited in the file of this patent
UNITED STATES PATENTS

| Number | Name | Date |
|---|---|---|
| 1,512,320 | Thornton | Oct. 21, 1924 |
| 1,800,605 | Crowley | Apr. 14, 1931 |
| 2,332,800 | Killough | Oct. 26, 1943 |
| 2,385,175 | Wachter | Sept. 18, 1945 |